July 3, 1951      H. J. FINDLEY      2,559,416
DRIVE
Filed Aug. 28, 1946
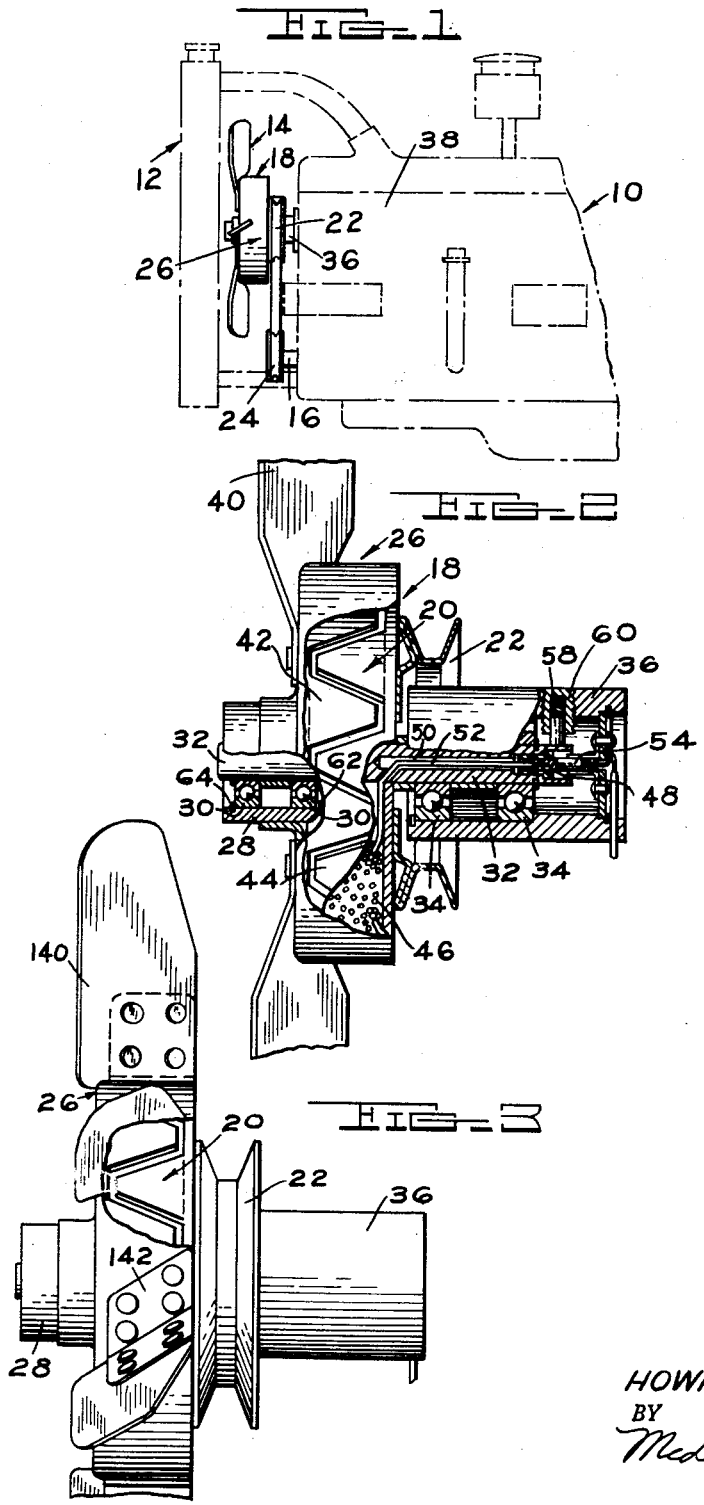
INVENTOR.
HOWARD J. FINDLEY
BY
McDonald & Fragno
ATTORNEYS Patented July 3, 1951

UNITED STATES PATENT OFFICE 2,559,416

2,559,416
DRIVE

Howard J. Findley, Chardon, Ohio, assignor to Eaton Manufacturing Company, Cleveland, Ohio, a corporation of Ohio Application August 28, 1946, Serial No. 693,492

4 Claims. (Cl. 230—270)

This invention relates to eddy current electromagnetic controllable speed transmitting mechanisms or drives and more particularly to structural features thereof as applied to engine cooling fans.

Broadly the invention comprehends the provision of electromagnetic drives or speed controllable transmitting mechanisms wherein the blades of an engine cooling fan driven thereby are directly mounted upon the driven drum member of the drives.

An object of the invention is the provision of a compact and effective engine cooling fan and controllable speed drive therefor.

Another object of the invention is the provision of an eddy current electromagnetic speed controllable transmitting mechanism for driving an engine cooling fan wherein the fan blades are mounted as an integral part of the driven drum member of the transmitting mechanism.

Another object of the invention is the provision of a controlled speed engine cooling fan wherein the drive is derived from a variable speed engine or prime mover.

A further object of the invention is the provision of a controlled output speed drive means for an engine cooling fan wherein the fan forms a component part of the drive.

Other objects and advantages of the invention will appear from the following description taken in connection with the drawings, forming a part of the specification; and in which:

Figure 1 is a fragmentary diagrammatic view of a vehicle engine, a cooling radiator, and an associated controlled speed engine cooling fan;

Figure 2 is a fragmentary, partially cross-sectionalized view of an eddy current electromagnetic transmission driven engine cooling fan; and Figure 3 is a fragmentary view of a modified form of eddy current electromagnetic transmission driven engine cooling fan.

The instant invention is directed at the provision of a controlled speed engine cooling fan wherein the fan comprises a part of the controllable speed transmitting means, that is, in this instance an eddy current electromagnetic drive capable of driving a fan at required operating speeds for all normal operating speeds of the associated vehicle engine from which the fan derives its motive force. The electromagnetic drive is conventionally constructed and as here presented comprises a drive member or rotor receiving its driving force from some suitable power take-off shaft of a variable speed internal combustion engine, a driven member or drum, and an eddy current electromagnetic coil energized means on one of the members effective to provide for a transmittal of driving forces between the drive and driven members.

In the present structure the driven member or drum has directly mounted and fixedly secured thereto a plurality of blades such that the driven drum and blades form an engine cooling fan unit. The blades may be mounted on the drum at the peripheral surface thereof or on the exterior radial face of the drum such that the inner portion of the fan blades are effective to pass cooling air across the outside of the drum and provide for the cooling thereof, that is, wherein the fan blades are of the axial air-flow delivery type. In some instances it might be more desirable to employ the blower or radial air-flow type of fan and accordingly this invention is directed at the inclusion of any type of fan or blower capable of performing like results.

Referring to the drawings for more specific details of the invention wherein like numerals designate like parts throughout the drawings, 10 represents a variable speed automotive vehicle engine of conventional design including a cooling radiator 12 and an engine cooling fan 14 driven from a power take-off shaft 16 of the engine.

Driving force from the take-off shaft 16 is transmitted to fan 14 by an eddy current electromagnetic controllable speed transmitting mechanism 18 specifically illustrated by Figure 2; said mechanism comprising a drive member or rotor 20 fixedly secured to a pulley 22 having belt connection with a pulley 24 of power take-off shaft 16 and a driven member or drum 26 journaled at its hub 28 through bearings 30 upon a shaft 32 secured to rotor 20, said shaft in turn being journaled on bearings 34 in a stationary housing 36 adapted to be mounted upon the block 38 of engine 10 as shown by Figure 1. This drive is of the type patented by Martin P. Winther with particular reference being had to Patent No. 2,367,-163 illustrating a comparable drive as herein shown and described.

The mechanism 18 is effective to transmit the variable speed of take-off shaft 16 into a controlled output speed at the fan in accordance with requirements for all normal driving ranges of the vehicle with which the engine 10 and fan 14 are adapted to be associated.

The outstanding feature of the instant invention resides in the mounting and securing of blades 40 of fan 14 directly upon the driven member or drum 26 of the mechanism 18 thus effecting a simple, compact and economical engine cooling fan structure wherein it is possible because of the employment of mechanism 18 to control the rotative speed of drum 26 and blades 40 in accordance with requirements for all normal operating speeds of engine 10. The blades 40 as shown by Figure 2 are of conventional design and as such instead of requiring the employment of a separate hub member are riveted or otherwise suitably secured to the outer face of drum 26. The blades 40 in view of their structural arrangement upon drum 26 provide for the distribution of cooling air across the exterior of drum 26 in addition to the primary function of cooling the fluid medium to be circulated through the radiator and engine. In so cooling the drum 26 the overall operating efficiency of the mechanism 18 is increased thus permitting of the use of a reasonably much smaller and compact mechanism than might otherwise be the case for an equivalent desired output.

The rotor 20 consists of a pair of identical annular members 42 and 44 of cross sectional U-shape fixedly mounted in adjacent relation upon shaft 32 providing therebetween an annular space for the reception of a ring shaped energizing coil 46. The members 42 and 44 forming the field body of the transmitting device are each provided with pole arms axially extended in alternately overlapping relation externally of the coil 46, said arms at the periphery being spaced from the internal surface of the drum by a predetermined amount.

One end of coil 46 is connected to a terminal post 48 mounted in bore 50 of shaft 32 by an insulated conduit 52 leading from the one end of the coil to the terminal post. The coil 46 is supplied current through the terminal post and conduit 52 by way of a contacting brush 54 which receives its electrical power from a source, not shown. The brush 54 is mounted in stationary housing 36 arranged upon bearings 34 supported upon shaft 32. The other end of coil 46 is grounded back to the housing 36 through a coil connection with member 44 through shaft 32 thence through a spring pressed contact brush 58 engaging the outer periphery of the shaft, said brush being mounted for radial movement in an adjustable cage 60 threaded in the housing 36.

The hub 28 of drum 26 secures the drum from axial movement in the provision of an annular shoulder 62 bearing upon a radial face of one of the bearings 30 and a snap ring 64 secured in the hub and bearing upon a radial face of the other bearing 28.

It is to be understood in the recitation of the drum 26 and blades 40 secured thereto as being operable at any required speed that reference is had to the operating characteristics of drive or mechanism 18 wherein depending upon the degree of energization of coil 46 the speed of drum 26 and blades 40 may be controlled to whatever speed conditions desired or required within normal operating ranges of the variable speed power source used to propel the rotor 20, that is, upon full energization of the coil the drum and blades will rotate at substantially the same speed as the rotor 20 and will rotate at a lesser speed than the rotor when the coil is partially energized. Preferably as a way of properly controlling the energization of the coil, control means are provided operable in accordance with the temperature of engine 10 effective to vary the degree of energization of coil 46 required to provide for proper speed operation of the drum 26 and blades 40 for efficient cooling of the engine.

Figure 3 illustrates a modified form of fan structure from that shown by Figure 2 in that blades 140 are mounted and fixedly secured upon the periphery of the drum 26 by annular supporting irons or braces 142 having a portion riveted or otherwise suitably secured to the blades and another portion riveted or otherwise fixedly secured to the drum. By this manner of construction any desirable type or shape of blade can be adapted for use so as to provide an effective cooling fan.

Although Figures 1 through 3 are illustrative of the axial air-flow type of fan or blower it is readily conceivable that a radial air-flow type of blower or fan can be substituted therefor as conditions require and accordingly the invention is not to be limited to the specific structure described by the drawing.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. An eddy current electromagnetic drive comprising a drive member, a driven drum member associated therewith and extending axially in telescoping fixed uniform circumferential clearance relation thereto, an electromagnetic coil carried by one of the members, and a plurality of fan blades fixedly secured to the driven member having their major portion extending radially therefrom in the axial zone of the telescoping relation between the drive and driven members.

2. An eddy current electromagnetic drive comprising a drive member, a driven drum member associated therewith having a continuous axially extended circumferential section encompassing the drive member in spaced circumferential relation thereto, an electromagnetic coil fixedly mounted in the drive member effective upon the energization thereof to produce eddy currents in the driven member for driving the driven member relative to the drive member upon rotation of the drive member, and a plurality of radial fan blades mounted upon the axially extended section of the driven member and extending radially beyond the periphery of the driven member in encompassing relation to the drive and driven members.

3. A controlled speed output, variable speed driven, electromagnetic drive, comprising a variable speed drive member, a controlled speed driven member including a radial portion and a continuous integral axially extended circumferential portion associated therewith in fixed spaced radial telescoping relation, a magnetic coil fixedly mounted in one of the members, means for energizing the coil, and a plurality of air impelling blades fixedly mounted upon the driven member extending radially and axially relative to the drive and driven members.

4. An electromagnetic drive comprising a variable speed drive rotor, a controlled speed driven drum associated with the rotor having a fixed axially extended circumferential portion thereof in fixed circumferential spaced encompassing relation thereto, an electromagnetic coil carried by the rotor, and a plurality of angularly spaced radially extended blades mounted upon the axially extended circumferential portion of the drum radially outwardly disposed about the rotor and drum.

HOWARD J. FINDLEY.

REFERENCES CITED

The following references are of record in the file of this patent:

UNITED STATES PATENTS

| Number | Name | Date |
| --- | --- | --- |
| 591,395 | Fay | Oct. 12, 1897 |
| 704,574 | Pintsch | July 15, 1902 |
| 1,373,848 | Waite | Apr. 5, 1921 |
| 1,636,050 | Fottinger | July 19, 1927 |
| 2,255,420 | Graham | Sept. 9, 1941 |
| 2,367,163 | Winther | Jan. 9, 1945 |
| 2,396,000 | Findley | Mar. 5, 1946 |